US012757267B2

(12) United States Patent
Etzine et al.

(10) Patent No.: US 12,757,267 B2
(45) Date of Patent: Oct. 6, 2026

(54) SEAMLESS CONTINUATION OF COMMUNICATION SESSIONS

(71) Applicant: Apple Inc., Cupertino, CA (US)

(72) Inventors: Justin R. Etzine, San Jose, CA (US); Bradley F. Patterson, Maple Valley, WA (US); Christopher M. Garrido, Santa Clara, CA (US); Karthick Santhanam, Campbell, CA (US); Nicholas J. Circosta, Mountain View, CA (US); Olivia R. Brown, Santa Clara, CA (US); Ryan P. Nielsen, Sunnyvale, CA (US); Sasanka T. Vemuri, San Ramon, CA (US); Yaseen Mahmoud, Sunnyvale, CA (US); Zak C. Wegweiser, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 634 days.

(21) Appl. No.: 18/113,584

(22) Filed: Feb. 23, 2023

(65) Prior Publication Data

US 2023/0371091 A1 Nov. 16, 2023

Related U.S. Application Data

(60) Provisional application No. 63/340,415, filed on May 10, 2022.

(51) Int. Cl.
*H04W 4/00* (2018.01)
*H04W 48/10* (2009.01)
(Continued)

(52) U.S. Cl.
CPC ........... *H04W 76/14* (2018.02); *H04W 48/10* (2013.01); *H04W 76/15* (2018.02); *H04L 12/1822* (2013.01); *H04L 65/403* (2013.01)

(58) Field of Classification Search
None
See application file for complete search history.

(56) References Cited

U.S. PATENT DOCUMENTS

2003/0135552 A1* 7/2003 Blackstock ......... H04L 12/1818 709/205
2010/0073457 A1* 3/2010 Xu ...................... H04L 12/1822 348/14.09

(Continued)

FOREIGN PATENT DOCUMENTS

CN 101426246 A 5/2009
WO WO 2015/003532 1/2015

OTHER PUBLICATIONS

International Search Report and Written Opinion from PCT/US2023/021598, dated Sep. 22, 2023, 10 pages.

*Primary Examiner* — Bob A Phunkulh
(74) *Attorney, Agent, or Firm* — BAKERHOSTETLER

(57) ABSTRACT

Aspects of the subject technology include transmitting, by a first device, an advertisement message corresponding to a communications session the first device is participating in with at least a second device. The first device may receive, during the communications session, a communications session control message generated by a third device. The communications session control message may include information contained in the advertisement message. The first device may validate the third device based on the communications session control message and remove the first device from the communications session in response to successfully validating the third device.

21 Claims, 9 Drawing Sheets

(51) Int. Cl.

| | |
|---|---|
| ***H04W 76/14*** | (2018.01) |
| ***H04W 76/15*** | (2018.01) |
| *H04L 12/18* | (2006.01) |
| *H04L 65/403* | (2022.01) |

(56) References Cited

U.S. PATENT DOCUMENTS

| | | | | |
|---|---|---|---|---|
| 2013/0010945 | A1 | 1/2013 | McDonald et al. | |
| 2020/0287951 | A1* | 9/2020 | Kolati | H04L 5/0055 |
| 2021/0044645 | A1* | 2/2021 | Jayaweera | H04L 12/1822 |
| 2021/0320953 | A1* | 10/2021 | Sexauer | H04L 65/1069 |
| 2021/0400142 | A1 | 12/2021 | Jorasch et al. | |
| 2022/0399024 | A1* | 12/2022 | Siyavudeen | G10L 15/01 |
| 2024/0064271 | A1* | 2/2024 | Murata | H04N 7/152 |

* cited by examiner

SEAMLESS CONTINUATION OF COMMUNICATION SESSIONS

CROSS-REFERENCE TO RELATED APPLICATIONS

The present application claims the benefit of U.S. Provisional Patent Application Ser. No. 63/340,415, entitled "SEAMLESS CONTINUATION OF COMMUNICATION [S] SESSIONS," filed May 10, 2022, which is hereby incorporated herein by reference in its entirety and made part of the present U.S. Utility Patent Application for all purposes.

TECHNICAL FIELD

The present description generally relates to group communications on electronic devices and, more particularly, to seamless continuation of conferencing sessions on other devices.

BACKGROUND

An electronic device such as a laptop, tablet, or smartphone, may be configured to participate in group communications sessions. Video communications sessions, for example, allow people in remote locations to each view a video stream of each other in real-time.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic devices may be configured to send and receive data between each other to engage in communications sessions (e.g., video calls, audio calls, and/or the like) with one or more other similarly configured electronic devices. A participant in a communications session may have multiple electronic devices (e.g., smartphone, laptop, tablet, and/or the like) that may be used to participate in a communications session. However, the participant typically cannot change which device is used in a particular communications session while the communications session is ongoing. The participant would first have to leave or end the communications session with the current device then join the communications session or start a new communications session with the new device in order to use the new device in a communications session.

In the subject system, a handoff process is provided for seamless continuation of a communications session from a first device to a second device. In one or more implementations, the first and second device may both be registered to a same user account. The handoff allows the state of a communications session from the first device to be transferred to the second device while leaving the communications session substantially unaffected for the other participants of the communications session.

Figure 1:
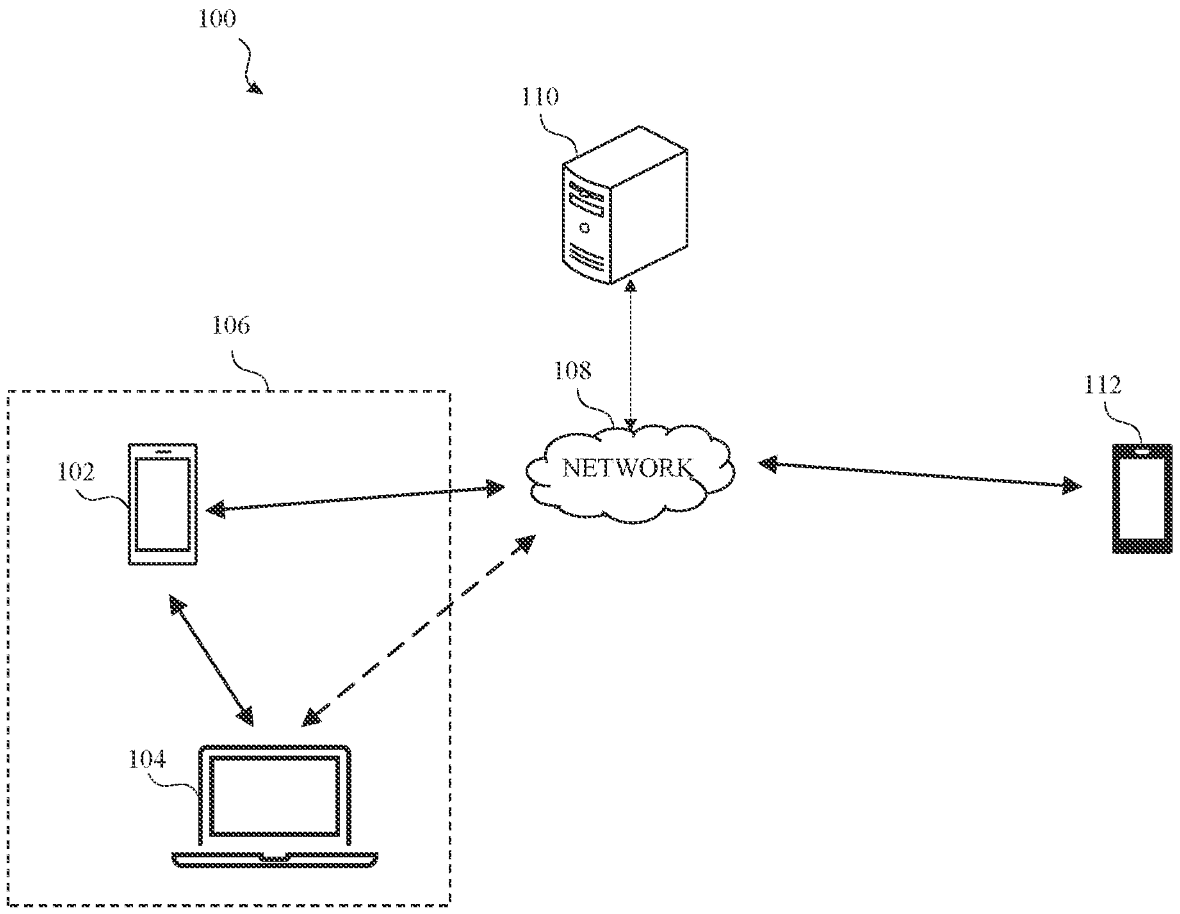
FIG. 1 illustrates an example network environment for conferencing sessions in which a conferencing session may be handed off from a first electronic device of a user account to a second electronic device of the user account, in accordance with one or more implementations.

FIG. 1 illustrates a network environment 100 for conferencing sessions in which a conferencing session is handed off from a first electronic device 102 of a user account to a second electronic device 104 of a user account, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 may include an electronic device 102, an electronic device 104, an electronic device 112, and one or more servers such as a server 110. The network 108 may communicatively (directly or indirectly) couple the electronic device 102, the electronic device 104, the electronic device 112, and/or a server 110. In one or more implementations, the network 108 may be an interconnected network of devices that may include, or may be communicatively coupled to, the Internet. For explanatory purposes, the network environment 100 is illustrated in FIG. 1 as including the electronic device 102, the electronic device 104, the electronic device 112, and the server 110; however, the network environment 100 may include any number of electronic devices and/or any number of servers communicatively coupled to each other directly or via network 108.

The electronic device 102 may be, for example, a desktop computer, a portable computing device such as a laptop computer, a smartphone, a peripheral device (e.g., a digital camera, headphones), a tablet device, standalone videoconferencing hardware, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In one or more implementations, the electronic device 102 may include a conferencing module (and/or circuitry) and one or more applications. In FIG. 1, by way of example, the electronic device 102 is depicted as a smartphone. The electronic device 102 may be, and/or may include all or part of, the electronic system discussed below with respect to FIG. 9. In one or more implementations, the electronic device 102 may include a camera and a microphone and may provide the conferencing module or application for obtaining and/or exchanging user communications data such as audio streams and/or video streams over the network 108, such as with a corresponding conferencing module or application that is installed and accessible at, for example, electronic device 104, and/or electronic device 112.

The electronic device 104 may be, for example, a portable computing device such as a laptop computer, a smartphone, a peripheral device (e.g., a digital camera, headphones), a tablet device, a wearable device such as a watch, a band, and the like, any other appropriate device that includes, for example, one or more wireless interfaces, such as WLAN radios, cellular radios, Bluetooth radios, Zigbee radios, NFC radios, and/or other wireless radios. In one or more implementations, the electronic device 104 may include a conferencing module and one or more applications. In FIG. 1, by way of example, the electronic device 104 is depicted as a laptop computer. The electronic device 104 may be, and/or may include all or part of, the electronic system discussed below with respect to FIG. 9. In one or more implementations, the electronic device 104 may include a camera and a microphone and may provide the conferencing module for obtaining and/or exchanging user communications data such as audio streams and/or video streams over the network 108, such as with a corresponding conferencing module that is installed and accessible at, for example, electronic device 102, and/or electronic device 112. The electronic device 104 may be in a location 106 that is nearby the electronic device 102 for directly sending and/or receiving messages with electronic device 102, such as Bluetooth messages or other near field communications.

The electronic device 112 may be, for example, a portable computing device such as a laptop computer, a smartphone, a peripheral device (e.g., a digital camera, headphones), a tablet device, a wearable device such as a watch, a band, and the like, any other appropriate device that includes, for example, one or more wireless interfaces, such as WLAN radios, cellular radios, Bluetooth radios, Zigbee radios, NFC radios, and/or other wireless radios. In one or more implementations, the electronic device 112 may include a conferencing module and one or more applications. In FIG. 1, by way of example, the electronic device 112 is depicted as a smartphone. The electronic device 112 may be, and/or may include all or part of, the electronic system discussed below with respect to FIG. 9. In one or more implementations, the electronic device 112 may include a camera and a microphone and may provide the conferencing module or application for obtaining and/or exchanging user communications data such as audio streams and/or video streams over the network 108, such as with a corresponding conferencing module or application that is installed and accessible at, for example, electronic device 104, electronic device 102, and/or electronic device 112.

In one or more implementations, one or more servers such as the conferencing server 110 may perform operations for managing the secure exchange of user communications data and/or communications sessions data between various electronic devices such as the electronic device 102, the electronic device 104, and/or the electronic device 112, such as during a group communications session (e.g., an audio conferencing session or a video conferencing session). In some variations, the conferencing server 110 is a relay server (e.g., a quick relay server). In some variations, the conferencing server 110 includes one or more app-specific modules (e.g., plugins) that perform operations for a respective application. In some variations, the conferencing server 110 includes one or more push modules for providing asynchronous notifications to one or more electronic devices (e.g., publish-subscribe messaging).

In one or more implementations, the conferencing server 110 may store account information (e.g., account, handles, or any other account-specific data) associated with the electronic device 102, the electronic device 104, the electronic device 112, and/or users of those devices. In one or more implementations, one or more servers such as the server 110 may provide content (e.g., media content, application content, or any other suitable data) that is to be processed at a participant device (e.g., the electronic device 102, the electronic device 104, the electronic device 112) by an application of the participant device.

Figure 2:
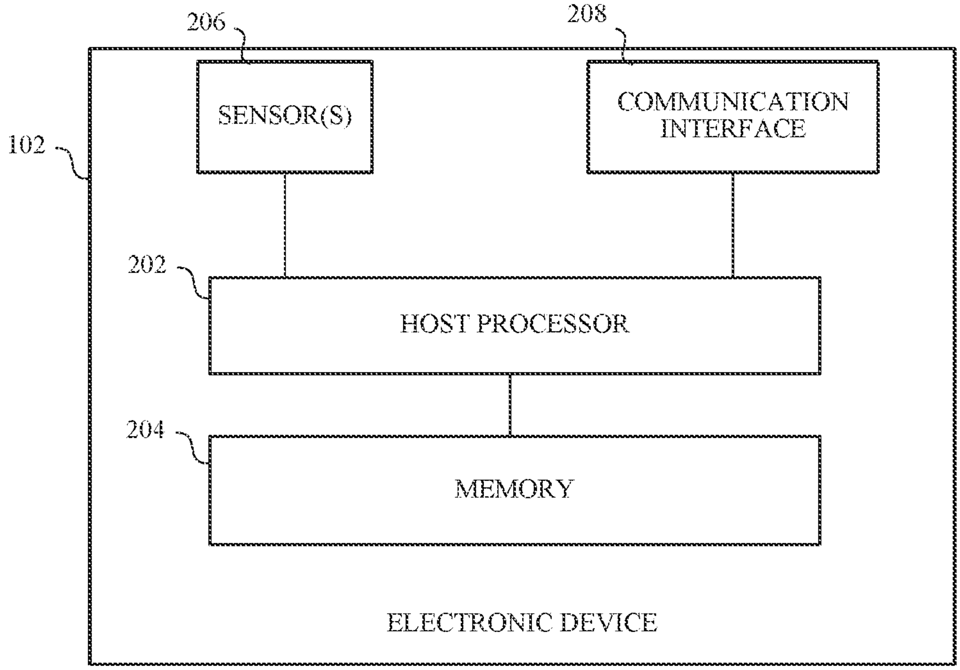
FIG. 2 depicts an example electronic device that may implement the subject methods and systems, in accordance with one or more implementations.

FIG. 2 depicts an electronic device that may implement the subject methods and systems, in accordance with one or more implementations. For explanatory purposes, FIG. 2 is primarily described herein with reference to the electronic device 102 of FIG. 1. However, this is merely illustrative, and features of the electronic device of FIG. 2 may be implemented in any of the electronic device 104 and/or the electronic device 112, or another electronic device for implementing the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include one or more of a host processor 202, a memory 204, one or more sensor(s) 206, and/or a communication interface 208. The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. The host processor 202 may further implement an operating system or may otherwise execute code to manage operations of the electronic device 102.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage. In one or more implementations, the memory 204 may store communications session data (e.g., as provided by the server 110) for participating in communications sessions with other electronic devices. The memory 204 may further store account information and any other type of identifier that associates the electronic device 102 with its corresponding user account.

The sensor(s) 206 may include one or more microphones and/or cameras. The microphones may be used to facilitate the audio features of a communications session. For example, the microphones may obtain audio signals corresponding to the voice of a participant of a communications session. The cameras may be used to facilitate the video features of a communications session. For example, the cameras may obtain images of the face of a participant of a communications session.

The communication interface 208 may include suitable logic, circuitry, and/or code that enables wired or wireless communication, such as between the electronic device 102 and the server 110. The communication interface 208 may include, for example, one or more of a Bluetooth communication interface, an NFC interface, a Zigbee communication interface, a WLAN communication interface, a USB communication interface, a cellular interface, or generally any communication interface.

In one or more implementations, one or more of the host processor 202, the memory 204, the sensor(s) 206, the communication interface 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
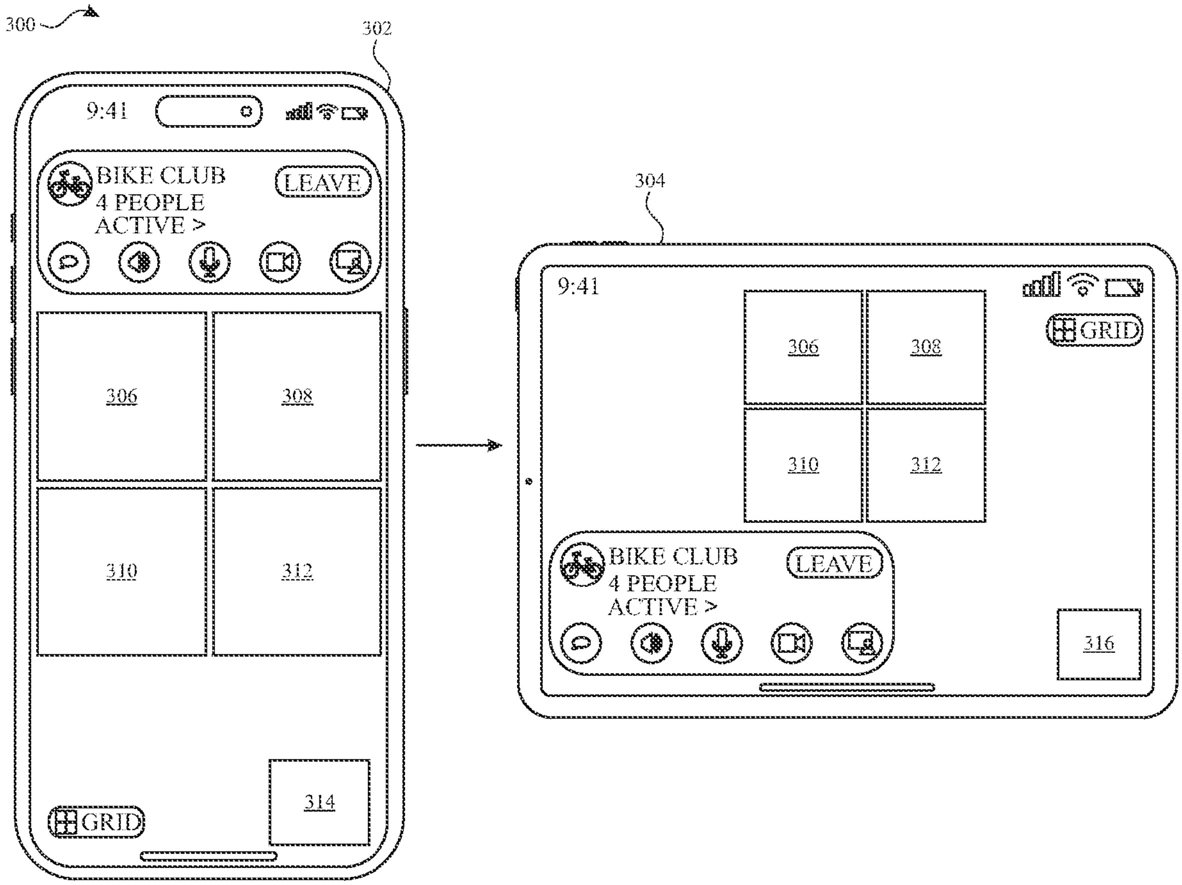
FIG. 3 depicts an example timing diagram in which a video communications session may be transitioned from a first device to a second device, in accordance with one or more implementations.

FIG. 3 depicts a timing diagram 300 in which a participant in a video communications session may continue or handoff a video communications session from a first device 302 to a second device 304, in accordance with one or more implementations. In one or more implementations, the first device 302 may be an implementation of the electronic device 102 of FIGS. 1 and 2, and the second device 304 may be an implementation of the electronic device 104 of FIG. 1. For example, the first device 302 may be a smartphone and the second device 304 may be a tablet. However, it is contemplated that the first device 302 and the second device 304 may be any electronic device configured to engage in communications sessions, such as video communications sessions, audio communications sessions, phone calls, and/or the like. In one or more implementations, the electronic device 102 and the electronic device 104 are associated with the same user account (e.g., a user account with the server 110 of FIG. 1).

As shown in FIG. 3, the first device 302 is a smartphone taking part in a video communications session. The first device 302 may present video feeds of the participants of the video communications session, such as a first video feed 306, a second video feed 308, a third video feed 310, and a fourth video feed 312. In one or more implementations, the first video feed 306, the second video feed 308, the third video feed 310, and the fourth video feed 312 are received from respective electronic devices of respective remote participants in the video communications session. The first device 302 may also present a fifth video feed 314 generated from a sensor on the first device 302, such as a camera.

For example, the fifth video feed 314 may include a view of the face of the user of the first device 302 and the second device 304. The first device 302 may handoff the video communications session to the second device 304 as described hereinafter in further detail. The handoff results in the video feeds of the participants of the video communications session (e.g., the first video feed 306, the second video feed 308, the third video feed 310, and the fourth video feed 312) being presented on the second device 304. The handoff also results in the replacement of the fifth video feed 314 with a sixth video feed 316 generated from a sensor on the second device 304. In one or more implementations, following the handoff, the first device 302 may discontinue obtaining the fifth video feed 314 and/or discontinue displaying the first video feed 306, the second video feed 308, the third video feed 310, and the fourth video feed 312. In the example of FIG. 3, four remote video feeds of four remote participants are shown; however, in other use cases, more than four or less than four remote video feeds may be displayed for more than four or less than four remote participants in the video communications session.

Figure 4:
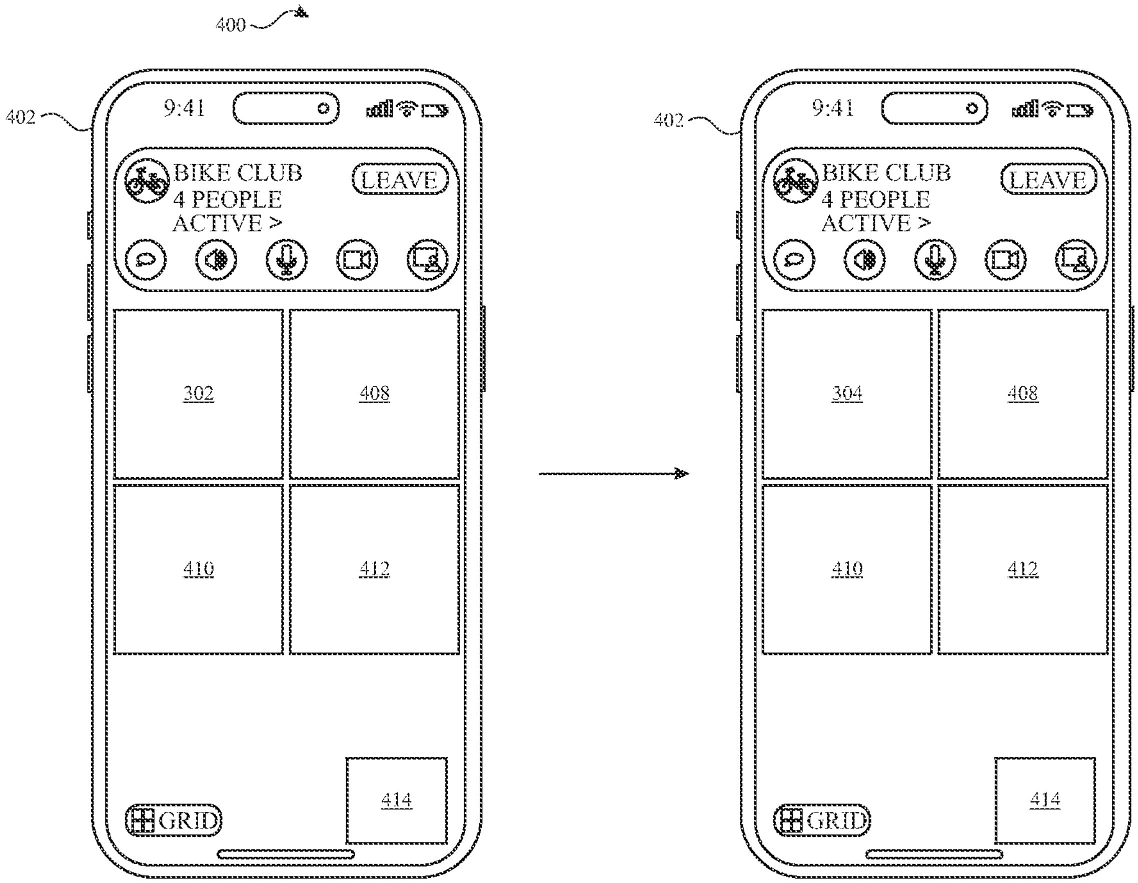
FIG. 4 depicts the example timing diagram of FIG. 3 in which a participant may first be presented a first video feed from the first device of the user account to a second video feed, in accordance with one or more implementations.

FIG. 4 depicts a timing diagram 400 in which a participant device 402 may first be presented a first video feed from the first device 302 of the user account to a second video feed from the second device 304 of the user account, in accordance with one or more implementations. The timing diagram 400 may be a perspective from a participant of the communications session of the timing diagram 300. The participant device 402 may be a smartphone. However, it is contemplated that the participant device 402 may be any electronic device configured to engage in communications sessions, such as video communications sessions, phone calls, and/or the like.

As shown in FIG. 4, the participant device 402 is a smartphone taking part in a video communications session. In terms of the timing diagram 300, the participant device 402 may correspond to any one of the first video feed 306, the second video feed 308, the third video feed 310, or the fourth video feed 312. The participant device 402 may present video feeds of the participants of the video communications session, such as a first video feed from the first device 302, a third video feed 408, a fourth video feed 410, and a fifth video feed 412. The participant device 402 may also present a sixth video feed 414 generated from a sensor on the participant device 402. The user account corresponding to the first video feed from the first device 302 may handoff the communications session from a first device to a second device (e.g., in the timing diagram 300). The handoff results in the participant device 402 displaying the video feeds from the other participants that did not perform a handoff (e.g., the third video feed 408, the fourth video feed 410, the fifth video feed 412, and the sixth video feed 414) as well as a second video feed from the second device 304 corresponding to the user account who had performed the handoff.

Figure 5:
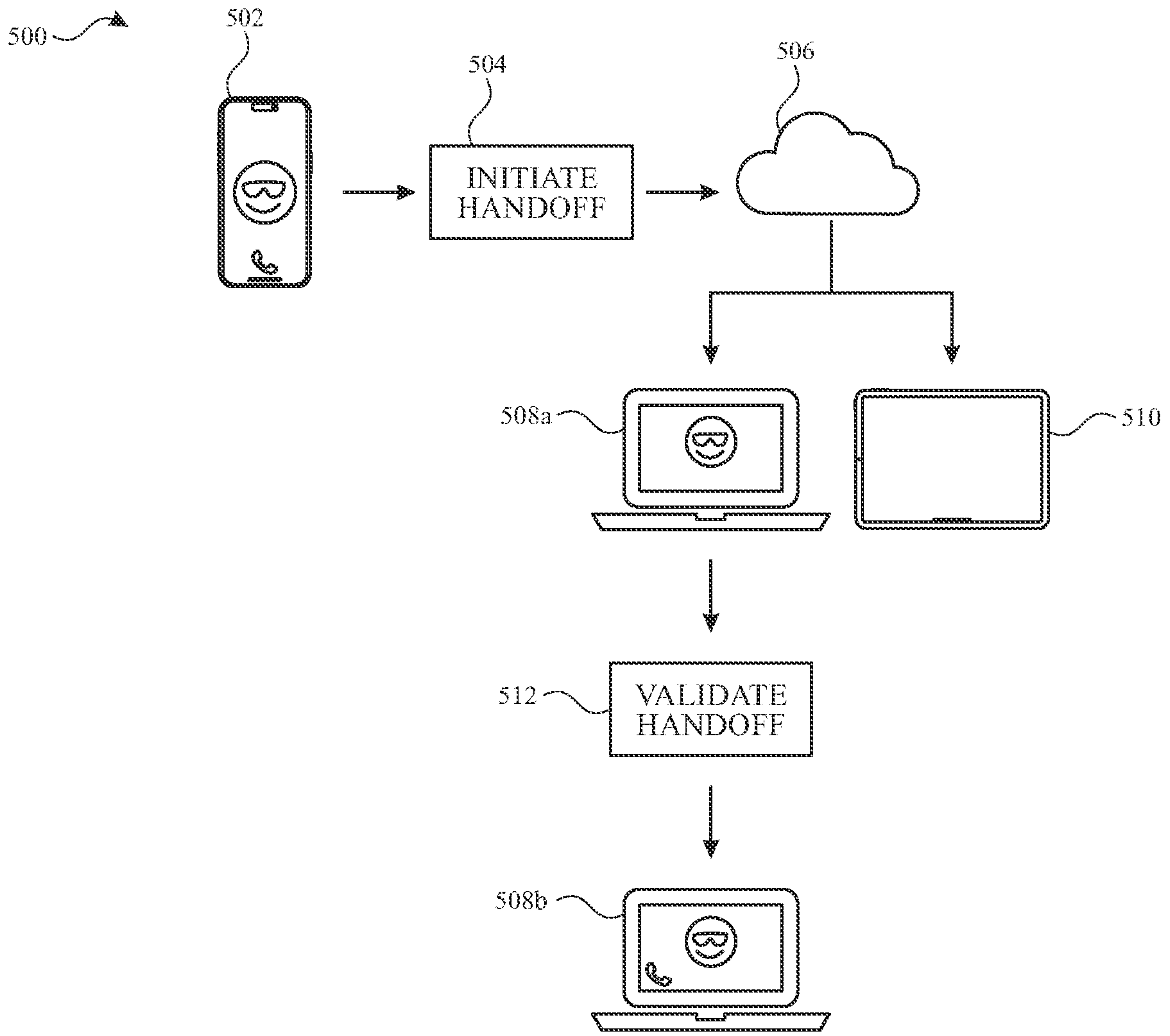
FIG. 5 depicts an example environment for transitioning a video communications session from a first device to a second device, in accordance with one or more implementations.

FIG. 5 depicts an environment 500 for transitioning a video communications session from a first device (e.g., a current device 502, such as the electronic device 102) to a second device (e.g., a new device 508, such as the electronic device 104), in accordance with one or more implementations. The current device 502 may be a smartphone, the new device 508 may be a laptop, and the other device 510 may be a tablet, each registered to the same user (e.g., each associated with the same user account). However, it is contemplated that the current device 502, the new device

508, and the other device 510 may be electronic devices configured to engage in communications sessions, such as video communications sessions, phone calls, and/or the like. As shown in the example of FIG. 5, the user is participating in a video communications session via the current device 502. Nearby, the user has the new device 508 and other device 510 as options to which the video communications session may be handed off. For example, the other device 510 may also be associated with the same user account of the user.

The current device 502 may be automatically or manually triggered to initiate the handoff 504 to another device. For example, another device (e.g., the new device 508 and the other device 510) may be selected from the current device 502, and/or the current device 502 may advertise an option to handoff the video communications session to the user's other devices (e.g., the new device 508 and the other device 510). To initiate the handoff 504, the current device 502 may send information related to the user account, information related to the current device 502, and/or information related to the video communications session to the user's other devices. In one or more implementations, the information may include information that may only be known to the current device 502. The information may be sent directly or indirectly to the user's other devices. For example, the information may be sent via a server 506 and pushed to the user's other devices.

A device may be selected from the current device 502 to receive the video communications session, or the user may use the device that is to receive the handoff to initiate the handoff. In the example of FIG. 5, the new device 508 may be selected to receive the handoff. In response to receiving the information from the current device 502 following the initiation of the handoff, the new device 508 may initiate a validation 512 of the handoff by sending some or all of information the new device 508 received from the current device 502 back to the current device 502, and to the other devices participating in the video communications session. The current device 502 and/or the other devices participating in the video communications session may validate 512 the handoff by verifying the accuracy of the information, such as described in more detail with regard to FIGS. 6-8. If the new device 508 is successfully validated, the validated new device 508*b* replaces the current device 502 in the video communications session. In one or more implementations, if the handoff is not successfully validated, the new device 508 may be rejected from the video communications session or may be added as a new participant device along with the current device 502.

Figure 6:
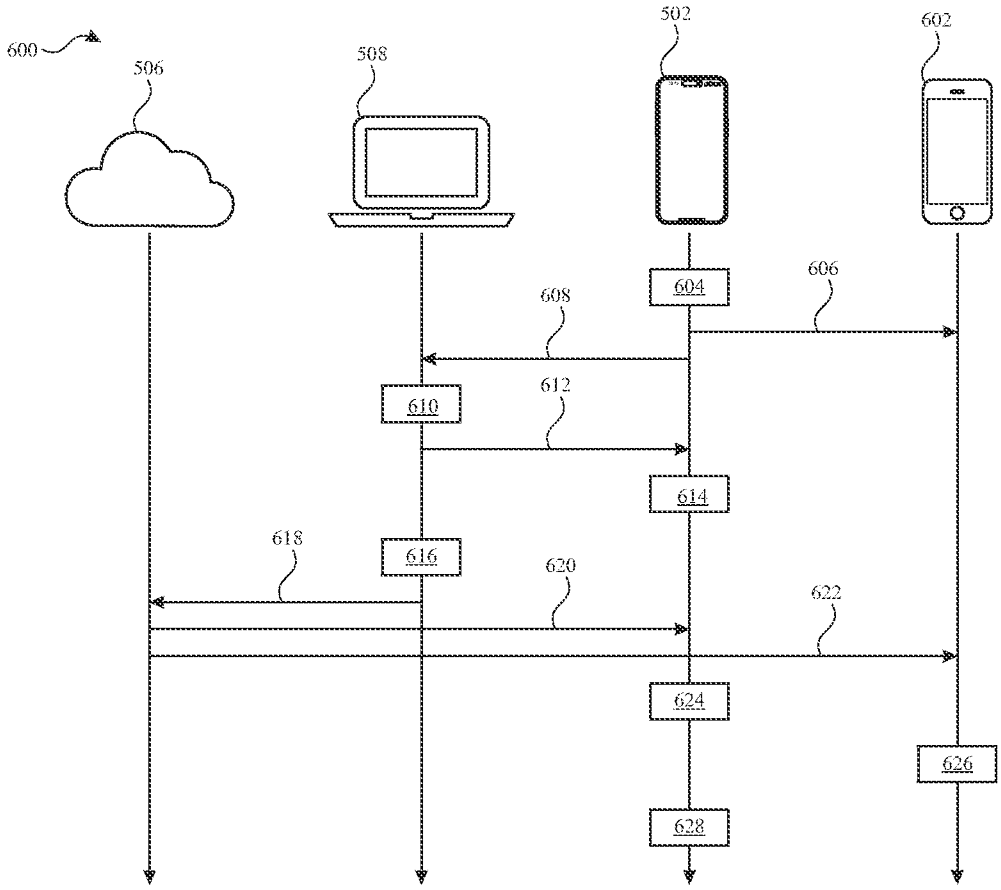
FIG. 6 depicts a sequence diagram of an example sequence for transitioning a conferencing session from a first device to a second device, in accordance with one or more implementations.

FIG. 6 depicts a sequence diagram of a sequence 600 for transitioning a conferencing session from a current device 502 (e.g., a first device, such as the electronic device 102) to a new device 508 (e.g., a second device, such as the electronic device 104), in accordance with one or more implementations. For explanatory purposes, the sequence 600 is primarily described herein with reference to the current device 502 and the new device 508 of FIG. 5. However, the sequence 600 is not limited to components or devices described in FIG. 5, and one or more blocks (also referred to as steps, sequences, or operations) of the sequence 600 may be performed by one or more other components and/or by other suitable devices. In addition, the blocks of the sequence 600 need not be performed in the order shown and/or one or more blocks of the sequence 600 need not be performed and/or can be replaced by other operations.

At block 604, the current device 502 initiates a communications session with a participant device 602. The participant device 602 represents any of one or more electronic devices (e.g., smartphones, tablets, laptop computers, and the like) registered to one or more user accounts that are not the user account of the current device 502 and new device 508 (e.g., associated with one or more user accounts other than the user account with which the current device 502 and new device 508 are associated). Additionally, although the current device 502 is depicted as a smartphone and the new device 508 is depicted as a laptop, the current device 502 and the new device 508 may be any kind of electronic device capable of participating in a communications session.

At operation 606 an invitation to the communications session is sent from a device of a user account (e.g., current device 502) to the devices of the participants in the communications session (e.g., participant device 602). In the example of FIG. 6, the current device 502 sends an invitation to the communications session to the participant device 602. At operation 608 an advertising message is sent from a device of the user account (e.g., current device 502) to one or more other devices of the user account (e.g., new device 508). In the example of FIG. 6, the current device 502 sends an advertising message to the new device 508. In some embodiments, the advertising message is included in an invitation to the communication session. In some embodiments, the advertising message is accompanied (e.g., preceded by, or followed by) an invitation to the communication session. In some embodiments, the advertising message indicates that the communications session to which the invitation applies is handoff capable. In one or more implementations, the advertisement may be sent to the other devices of the user account following registration for the advertisement message by the other devices. In some implementations, a device registers for the advertisement message in response to receiving an invitation to the communication session. In one or more implementations, the current device 502 may only transmit the advertisement message to the new device 508 when it is determined (e.g., by the current device 502) that the current device 502 and the new device 508 share the same user account, are physically nearby (e.g., within range of direct peer-to-peer communications), and/or use the same handle (e.g., a phone number or an email) to be addressed. In some implementations, the invitation sent to participant devices that are not associated with the same user account as the current device 502 are not provided with the advertisement message. In some implementations, the device of the user account (e.g., current device 502) does not send an advertisement message to participant devices that are not associated with the same user account as the current device 502. In some implementations, the invitations may include information about the current device 502 and/or information about the communications session, as described in further detail below with regard to FIGS. 7 and 8. In some implementations, the advertising messages may include information about the current device 502 and/or information about the communications session, as described in further detail below with regard to FIGS. 7 and 8. Although FIG. 6 depicts the device that initiates the communications session as sending invitations/advertisements, it will be understood that any device participating in a communications session may send invitations/advertisements and share information between devices.

At block 610, a UI indicator may be presented on an electronic display of one or more devices sharing an account with the current device 502, the UI indicator indicating that a nearby communications session can be handed off to this device. For example, a notification may appear on the electronic display of the new device 508 indicating that a communications session on the current device 502 may be handed off to the new device. The UI indicator (e.g., the notification) may be confirmed, denied, or ignored.

At operation 612, if the UI indicator indicating the availability of the handoff is confirmed on a device, then the device may transmit a message to the sender device (of the advertising message, e.g., 502) indicating that the communications session is to be handed off. For example, if the notification on the new device 508 is confirmed, the new device 508 may transmit a message to the current device 502 indicating that the communications session is to be handed off.

At block 614, the device that will handoff the communications session to another device may prepare for handing off the communications session. The preparation may include controlling a speaker, microphone, display, or any other aspect of the device. For example, the current device 502 may mute the speaker and microphone so that the uplink and downlink of the communications session from the current device 502 does not duplicate audio from the new device 508 once the new device 508 joins the communications session.

At block 616, the device that confirmed the handoff of the communications session (e.g., the new device 508) may prepare for joining the communications session. Preparing may include creating a data object that includes a participant association information to represent the association of the new device 508 with the current device 502. The participant association information may include session-specific identifiers such as a session-specific participant ID and a stream ID, which may be based on the advertisement message (e.g., included in the advertisement message) from operation 608. Preparing may also or instead include creating a communications session control message including the participant association information, an account identifier associated with the new device 508 and a participant handle associated with the new device 508. The account identifier and the participant handle may also be those associated with the current device 502.

At operation 618, the server 506 may receive data including the participant association information from the new device 508. The new device 508 may package the data into a communications session control message and send the communications session control message to the server 506 to be pushed to the participants of the communications session (e.g., current device 502 and participant device 602). In one or more implementations, the server 506 may package the information into a communications session control message for pushing to the participants of the communications session.

At operations 620 and 622, the server 506 may push the communications session control message to the participants of the communications session. For example, the current device 502 and the participant device 602 may receive the communications session control message from the server 506 in operations 620 and 622, respectively.

At block 624, the device handing off the communications session may validate the communications session control message. For example, the current device 502 may determine that the communications session control message from the new device 508 includes information about the current device 502 and/or the communications session that the current device 502 can independently verify. The validation process of the current device 502 is further described below with regard to FIG. 7.

At block 626, the participants in the communications session may also validate the communications session control message. For example, the participant device 602 may determine that the communications session control message from the new device 508 includes information about the current device 502 and/or the communications session that the participant device 602 received from the current device 502 at operation 606. The validation process of the participant device 602 is further described below with regard to FIG. 8.

At block 628, the device handing off the communications session (e.g., the current device 502) removes itself from the communications session. Removing the current device 502 from the communications session may include the current device 502 transmitting a leave message corresponding to the communications session to the server 506. The server 506 may push the leave message to the participants of the communications session (e.g., the new device 508 and the participant device 602). In one or more implementations, to account for the scenario where the leave message arrives before the communications session control message of block 616, the leave message may also include at least some of the information from the communications session control message, which includes the participant association information, the account identifier associated with the new device 508 and a participant handle associated with the new device 508, as generated at block 616.

In one or more implementations, the validation of the new device may not be successful for both the current device 502 and the participant device 602, in which case, the current device 502 may omit block 628 and remain in the communications session. In one or more implementations, one or more devices (e.g., the new device 508 and/or the participant device 602) participating in the communications session may have initiate a timeout after the after a new device (e.g., the new device 508) joins the communications session after which the device handing off the communications session (e.g., the current device 502) is removed from the communications session, if it has not done so already.

Figure 7:
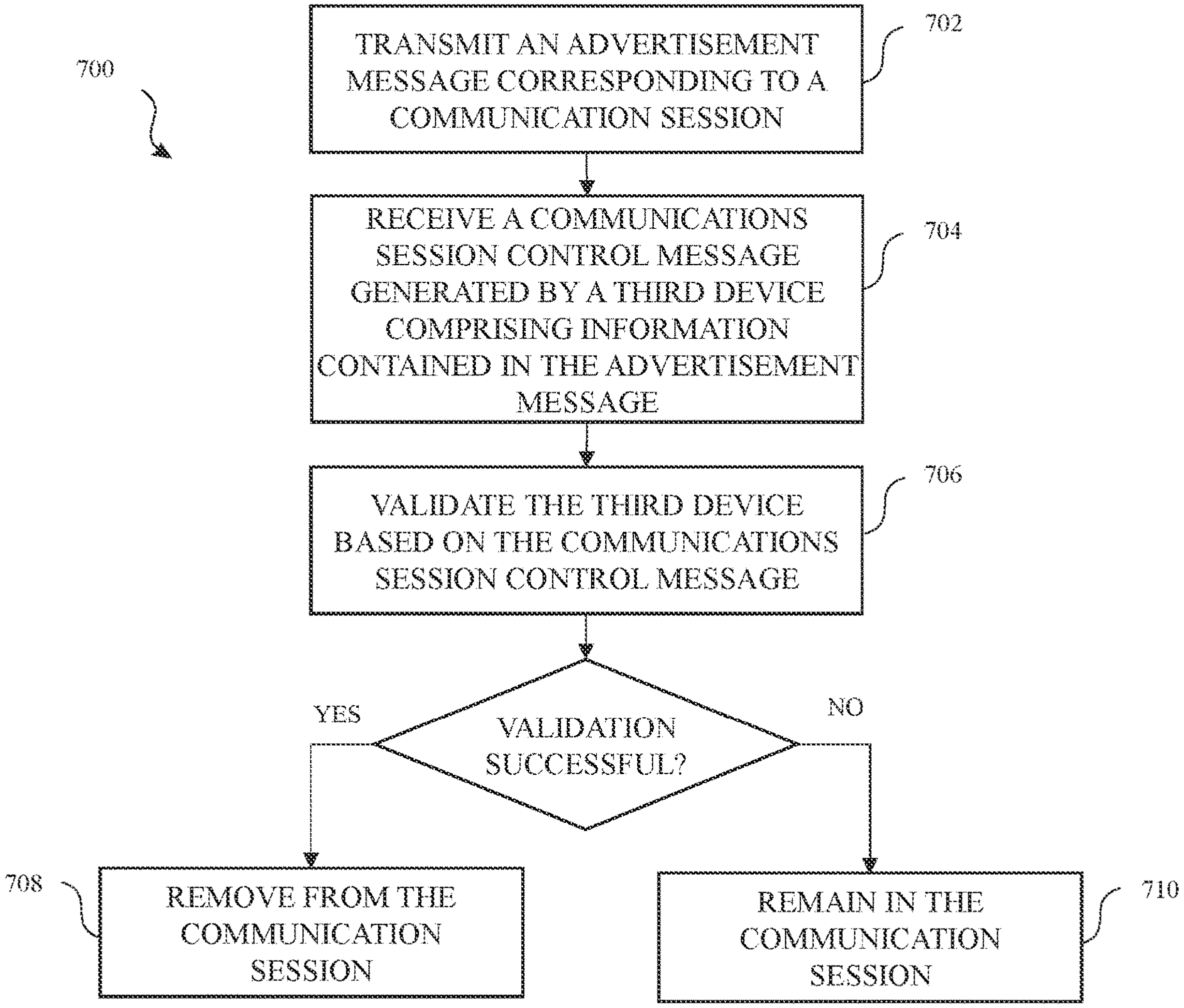
FIG. 7 depicts a flow diagram of an example process for validating a new device of a user account with a current device of the user account, in accordance with one or more implementations.

FIG. 7 depicts a flow diagram of a process 700 for validating a new device of a user account with a current device of the user account, in accordance with one or more implementations. For explanatory purposes, the process 700 is primarily described herein with reference to the electronic device 102 of FIGS. 1 and 2 and the sequence diagram and current device 502 of FIG. 6. However, the process 700 is not limited to the electronic device 102 and/or the current device 502, and one or more blocks (also referred to as steps or operations) of the process 700 may be performed by one or more other components of the electronic device 102, and/or by other suitable devices. Further, for explanatory purposes, the blocks of the process 700 are described herein as occurring sequentially or linearly. However, multiple blocks of the process 700 may occur in parallel. In addition, the blocks of the process 700 need not be performed in the order shown and/or one or more blocks of the process 700 need not be performed and/or can be replaced by other operations.

At block 702, an advertisement message is transmitted from a current device (e.g., current device 502, such as electronic device 102). The advertisement message corresponds to a communications session the current device is participating in with at least a participant device. The advertisement message may contain information about the communications session and/or the current device as it relates to the communications session. For example, the advertisement message may include a session-specific participant ID and a stream ID, in which the session-specific participant ID and the stream ID are both associated with the communications session and the current device. During the communications session, the current device may transmit the advertisement message to the new device directly or indirectly. For example, the advertisement message may be transmitted to the new device directly via Bluetooth. In one or more implementations, the current device may only transmit the advertisement message to the new device when it is determined that the current device and the new device share the same account, are physically nearby, and/or use the same handle to be addressed.

At block 704, a communications session control message is received by the current device. The communications session control message is generated by the new device, which received the advertisement message at block 702. To generate the communications session control message, the new device may create a data object that includes a participant association information to represent the new device's association with the current device. Accordingly, the participant association information may include session-specific identifiers such as a session-specific participant ID and a stream ID, which may be based on the advertisement message (e.g., included in the advertisement message). In addition to the participant association information, the communications session control message may also include an account identifier associated with the new device and a participant handle associated with the new device. In a case in which the new device belongs to the user account of the current device (e.g., is registered to the same user account to which the current device is registered) and would be successfully verified, the account identifier and the participant handle may also be the same account identifier and participant handle associated with the current device.

The communications session control message may be received directly or indirectly. The communications session control message may be received directly from the new device. For example, the communications session control message may be sent via Bluetooth. The communications session control message may also or instead be received indirectly from the communications session server (e.g., the server 110 and/or the server 506) during the communications session. For example, the communications session control message may be sent via a push message on a wide area network.

At block 706, the new device may be validated by the current device. Validation is based on at least a comparison of the identifiers of the current device and the identifiers of the communications session control message. The identifiers may include a session-specific participant ID that is unique to a participant of a group communications session as well as a stream ID that is unique to a video stream of a participant of a group communications session. The identifiers may be created as part of the group communications session to facilitate the group communications session. The comparison may include determining that the communications session control message includes a data object, such as participant association information as described with regard to block 704 and determining that a participant association information in the data object of the communications session control message includes a session-specific participant ID and a stream ID of the current device in the communications session. The current device compares its session-specific participant ID and stream ID against the session-specific participant ID and stream ID from the communications session control message that the new device suggests belongs to the current device.

The comparison may further include determining that the communications session control message includes an account identifier associated with the current device and a participant handle associated with the current device. The current device compares its account identifier and participant handle against the account identifier and participant handle from the communications session control message that the new device suggests belongs to the current device.

At block 708, if the validation of block 706 is successful, the current device removes itself from the communications session. A validation may be considered successful when all of the data fields, or any other specified number of data fields, compared in the comparison are matching. Removing the current device from the communications session may include the current device transmitting a leave message corresponding to the communications session to the communications session server. The communications session server may push the leave message to the participants of the communications session (e.g., the new device and the participant device). In one or more implementations, the leave message may include at least some of the information from the communications session control message as received at block 704, such as the participant association information.

At block 710, if the validation of block 706 is not successful, the current device may remain in the communications session. A validation may be considered not successful when none of the data fields, or any other specified number of data fields, compared in the comparison are matching. In one or more implementations, to accommodate the new device in the communications session, the communications session may change formats. For instance, one or more participants in the communications session may upgrade the communications session from a one-on-one communications session to a group communications session if the received communications session control message is attempting to add the new device, and if the communications session only includes the current device and the participant device. In one or more implementations, if the validation of block 706 is not successful, the new device may be added to the communications session as a new participant device along with the remaining current device. For example, one or more of the participant devices of the communications session may approve the new device as a new participant device separately from the handoff operations.

Although the new device may still be included in the group communications session as a new participant despite not being validated for handoff, in some use cases, participant devices of the group communications session may still reject the new device from joining and/or have the ability to remove the new device from the group communications session in one or more implementations. For example, one or more of the participant devices of the group communications session may receive a notice that the new device is attempting to join the group communications session and a prompt to remove the new device. In one or more implementations, the communications session may be downgraded from a group communications session to a one-on-one communications session if the current device is replaced with the new device and the communications session has only the new device and the participant device. The communications session may also be downgraded from a group communications session to a one-on-one communications session if the new device is blocked or removed from joining the communications session and the communications session has only the current device and the participant device.

Figure 8:
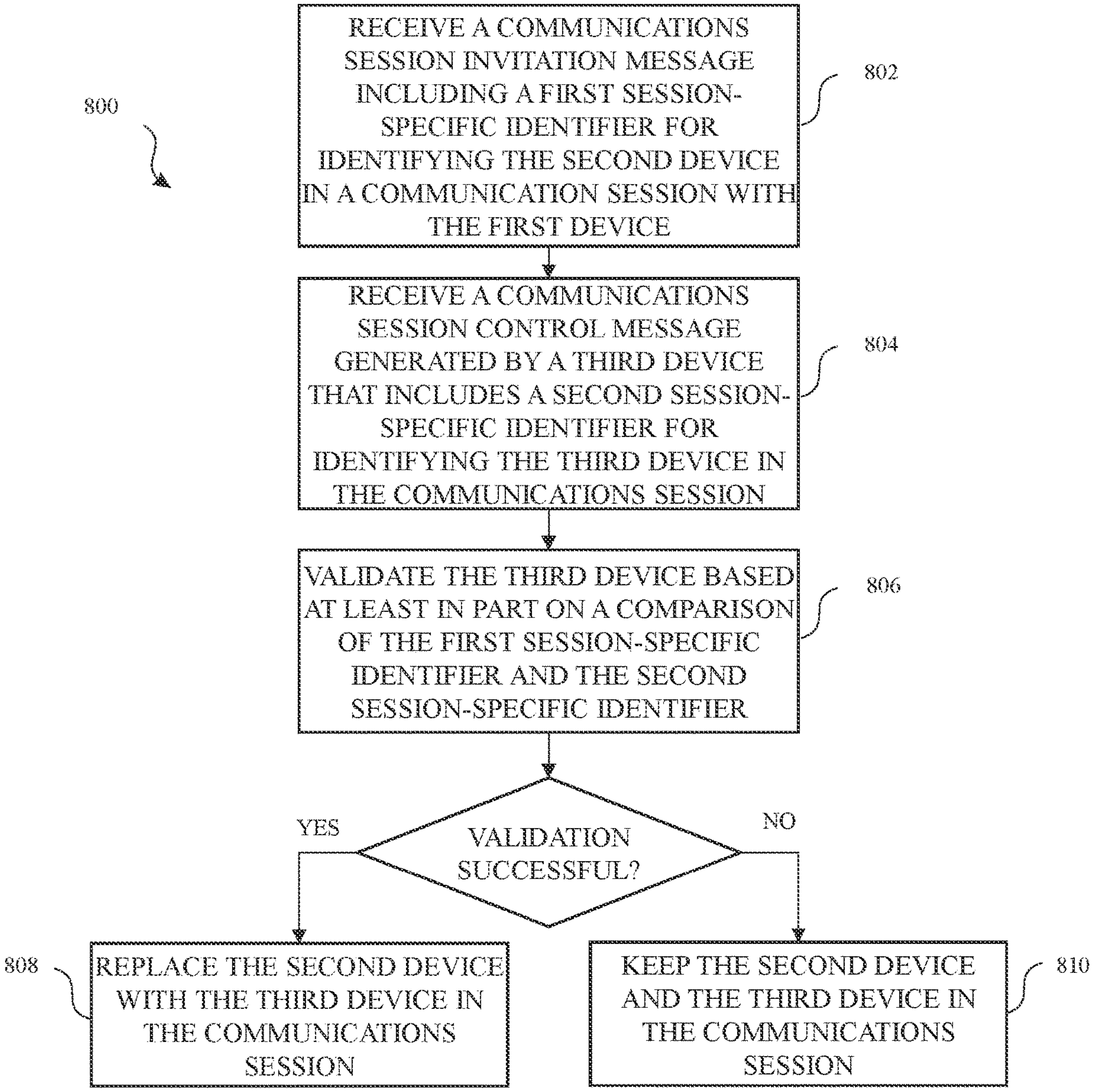
FIG. 8 depicts a flow diagram of an example process for validating a new device of a user account with a device of a participant, in accordance with one or more implementations.

FIG. 8 depicts a flow diagram of a process 800 for validating a new device of a user account with a device of a participant, in accordance with one or more implementations. For explanatory purposes, the process 800 is primarily described herein with reference to the electronic device 112 of FIGS. 1 and 2 and the participant device 602 and sequence diagram of FIG. 6. However, the process 800 is not limited to the electronic device 112 and/or the participant device 602, and one or more blocks (also referred to as steps or operations) of the process 800 may be performed by one or more other components of the electronic device 102, and/or by other suitable devices. Further, for explanatory purposes, the blocks of the process 800 are described herein as occurring sequentially or linearly. However, multiple blocks of the process 800 may occur in parallel. In addition, the blocks of the process 800 need not be performed in the order shown and/or one or more blocks of the process 800 need not be performed and/or can be replaced by other operations.

At block 802, a communications session invitation message is received. The communications session invitation message is a message for inviting other devices to participate in a group communications session, such as a video communications session or any other group conferencing session. The communications session invitation message may be received by at least a first device (e.g., participant device 602) that, once joined in the communications session, is referred to herein as a participant device associate with a user account participating in the communications session. The communications session invitation message may be sent from a second device that is referred to herein as a current device (e.g., current device 502) registered to a user account in the communications session who is changing (e.g., handing off) from the second device to a new device (e.g., a third device, such as the new device 508 and/or the electronic device 104). In one or more implementations, other communications session messages may be received, to share information between participants to facilitate the validation of new devices from other participants.

The communications session invitation message may include a first session-specific identifier. The first session-specific identifier may include one or more identifiers that may be used to identify the current device in the communications session. For example, the first session-specific identifier may include a session-specific participant ID that is unique to a participant of a group communications session as well as a stream ID that is unique to a video stream of a participant of a group communications session. The first session-specific identifier may be created as part of the group communications session to facilitate the group communications session. Although the first session-specific identifier may identify the current device, the account associated with the current device and the name that the current device is referred to within a software application may be sent with an account identifier and participant handle, respectively, which may accompany the first session-specific identifier.

Upon receiving the communications session invitation message, the participant device may also share its session-specific identifier. With each device in the communications session having the session-specific identifiers of the other devices participating in the communications session (e.g., as a result of this sharing), any participant in the group communications session may replace their device with another device associated with the same account while remaining in the communications session. Therefore, it should be understood that the handing off of the communications session from one device to another is not limited to the current device.

At block 804, a communications session control message may be received (e.g., by the participant device). The communications session control message may be a message sent from a communications session participant and/or a server that is arranged to configure the communications session. The communications session control message may be generated by the new device of the user account (e.g., the third device) and include a second session-specific identifier for identifying the new device in the communications session. The new device may create a second session-specific identifier using information received from the current device (e.g., via a communications session invitation, via an advertisement message, etc.). In some implementations, the new device creates the second session-specific identifier using information included in an invitation similar to the group communications session invitation that was sent to the participant device in block 802. In some implementations, the new device creates the second session-specific identifier using information included in an advertisement message (e.g., a Bluetooth message) from the current device to the new device when the devices share the same account and are physically close to each other.

The communications session control message may include an account identifier associated with the new device, a participant handle associated with the new device, and/or a data object that includes a participant association information. The account identifier may indicate the account associated with the new device, and the participant handle may indicate how the new device is to be addressed. The participant association information may be a data structure that includes the identifiers used by the current device in the group communications session and sent to the new device from the current device. For example, the participant association information in the communications session control message generated by the new device may include a session-specific participant ID and a stream ID, wherein the session-specific participant ID and the stream ID are both based on the communications session and both correspond to the current device.

The new device may send the communications session control message to the participants of the communications session (e.g., the participant device) directly or indirectly. For example, the communications session control message may be sent to a push service in a cloud server for delivery to the participants of the communications session via a wide area network. The communications session control message may be received by the participant device to validate the new device's association with the current device. As another example, the communications session control message may be sent directly to the participant device via a Bluetooth message.

At block 806, the new device may be validated by the participant device. In one or more implementations, validation is based at least in part on a comparison of the first session-specific identifier contained in the communications session invitation and the second session-specific identifier contained in the communications session control message. For example, the comparison may include determining that the communications session control message includes a data object, such as participant association information as described with regard to block 804, and determining that a participant association information in the data object of the communications session control message includes a session-specific participant ID and a stream ID of the current device in the communications session. The participant device may have at least the session-specific participant ID and stream ID of the current device from the communications session invitation message, as described in block 802, which may be compared against the session-specific participant ID and stream ID from the communications session control message that the new device claims to belong to the current device.

The comparison may further include determining that the communications session control message includes an account identifier associated with the current device and a participant handle associated with the current device. The participant device may have an account identifier and the participant handle of the current device from the communications session invitation message, as described in block 802, which may be compared against the account identifier and participant handle from the communications session control message that the new device claims to belong to the current device.

At block 808, if the validation of block 806 is successful, the current device is replaced with the new device in the communications session. Replacing the current device with the new device in the communications session may include transitioning the participant device's display of a video stream associated with the current device to another video stream associated with (e.g., received from) the new device. The video stream of the new device may be displayed at a location in a UI for the communications session that is the same location where the video stream of the current device was located. That way, the participant is presented with the video stream of the user account in the same UI location on the participant device and a substantially seamless handoff from the current device to the new device is achieved at the participant device. In one or more implementations, the participant device may also generate a UI indication that the current device has been replaced by the new device in the communications session. For example, if the current device is a smartphone and the new device is a laptop, the UI may display a smartphone icon next to the video stream of the user account while the current device is in use and then a laptop icon next to the video stream of the user account when the new device is in use.

At block 810, if the validation of block 806 is not successful, the new device may join the communications session without replacing the current device. In one or more implementations, to accommodate the new device in the communications session, the communications session may change formats. For instance, one or more participants in the communications session may upgrade the communications session from a one-on-one communications session to a group communications session if the received communications session control message is attempting to add the new device and the communications session only includes the current device and the participant device.

Although the new device may still be included in the group communications session despite not being validated for handoff, participants of the group communications session may still admit or reject the new device from joining and/or have the ability to remove the new device from the group communications session. For example, one or more of the participants of the group communications session may receive a notification that the new device is attempting to join the group communications session and a prompt to remove the new device. In one or more implementations, the communications session may be downgraded from a group communications session to a one-on-one communications session if the current device is replaced with the new device and the communications session has only the new device and the participant device. The communications session may also be downgraded from a group communications session to a one-on-one communications session if the new device is blocked or removed from joining the communications session and the communications session has only the current device and the participant device.

As described above, one aspect of the present technology is the gathering and use of data available from specific and legitimate sources for handoff of communications sessions. The present disclosure contemplates that in some instances, this gathered data may include personal information data that uniquely identifies or can be used to identify a specific person. Such personal information data can include demographic data, location-based data, online identifiers, telephone numbers, email addresses, home addresses, images, videos, audio data, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for handoff of communications sessions. Accordingly, use of such personal information data may facilitate transactions (e.g., online transactions). Further, other uses for personal information data that benefit the user are also contemplated by the present disclosure. For instance, health and fitness data may be used, in accordance with the user's preferences to provide insights into their general wellness or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of the handoff of communications sessions, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed implementations, the present disclosure also contemplates that the various implementations can also be implemented without the need for accessing such personal information data. That is, the various implementations of the present technology are not rendered inoperable due to the lack of all or a portion of such personal information data.

Figure 9:
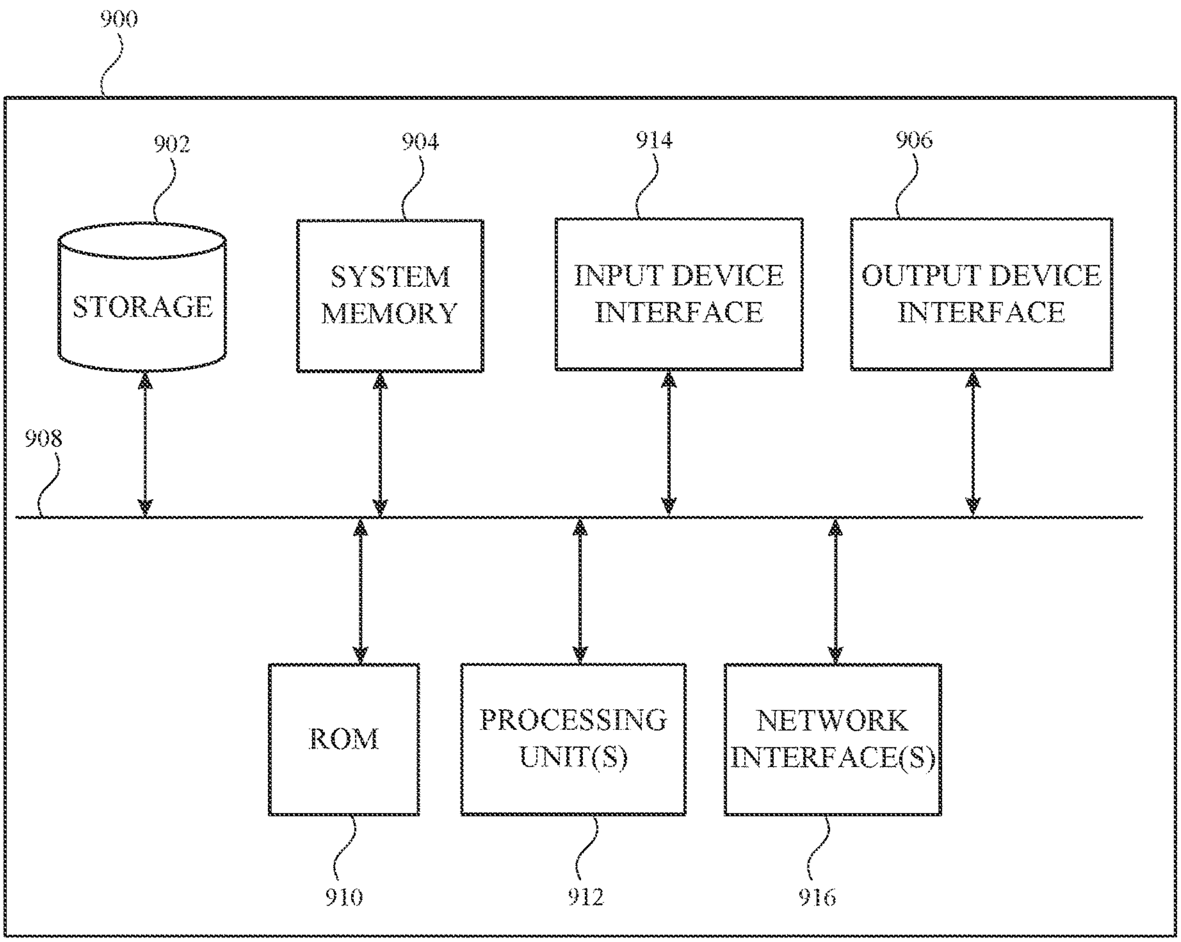
FIG. 9 depicts an example electronic device with which aspects of the present disclosure may be implemented, in accordance with one or more implementations.

FIG. 9 depicts an example electronic device with which aspects of the present disclosure may be implemented. The electronic device 900 can be, and/or can be a part of, any electronic device for generating the features and processes described in reference to FIGS. 1-8, including but not limited to a laptop computer, tablet computer, smartphone, and wearable device (e.g., smartwatch, fitness band). The electronic device 900 may include various types of computer-readable media and interfaces for various other types of computer-readable media. The electronic device 900 includes one or more processing unit(s) 912, a persistent storage device 902, a system memory 904 (and/or buffer), an input device interface 914, an output device interface 906, a bus 908, a ROM 910, one or more processing unit(s) 912, one or more network interface(s) 916, and/or subsets and variations thereof.

The bus 908 collectively represents all system, peripheral, and chipset buses that communicatively connect the numerous internal devices of the electronic device 900. In one or more implementations, the bus 908 communicatively connects the one or more processing unit(s) 912 with the ROM 910, the system memory 904, and the persistent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic device 900. The persistent storage device 902, on the other hand, may be a read-and-write memory device. The persistent storage device 902 may be a non-volatile memory unit that stores instructions and data even when the electronic device 900 is off. In one or more implementations, a mass-storage device (such as a magnetic or optical disk and its corresponding disk drive) may be used as the persistent storage device 902.

In one or more implementations, a removable storage device (such as a floppy disk, flash drive, and its corresponding disk drive) may be used as the persistent storage device 902. Like the persistent storage device 902, the system memory 904 may be a read-and-write memory device. However, unlike the persistent storage device 902, the system memory 904 may be a volatile read-and-write memory, such as RAM. The system memory 904 may store any of the instructions and data that one or more processing unit(s) 912 may need at runtime. In one or more implementations, the processes of the subject disclosure are stored in the system memory 904, the persistent storage device 902, and/or the ROM 910. From these various memory units, the one or more processing unit(s) 912 retrieves instructions to execute and data to process in order to execute the processes of one or more implementations.

The bus 908 also connects to the input device interfaces 914 and output device interfaces 906. The input device interface 914 enables a user to communicate information and select commands to the electronic device 900. Input devices that may be used with the input device interface 914 may include, for example, alphanumeric keyboards, touch screens, and pointing devices (also called "cursor control devices"). The output device interface 906 may enable, for example, the display of images generated by electronic device 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic device 900 to one or more networks and/or to one or more network nodes through the one or more network interface(s) 916. In this manner, the electronic device 900 can be a part of a network of computers (such as a LAN, a wide area network ("WAN"), or an Intranet, or a network of networks, such as the Internet). Any or all components of the electronic device 900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, one or more implementations, one or more implementations, an embodiment, the embodiment, another embodiment, one or more implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase (s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any implementation described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:

transmitting, by a first device, an advertisement message corresponding to a communications session the first device is participating in with at least a second device;

receiving, by the first device and during the communications session, a communications session control message generated by a third device, the communications session control message comprising information contained in the advertisement message;

validating, with the first device, the third device based on the communications session control message; and removing the first device from the communications session in response to successfully validating the third device, wherein removing the first device comprises causing initiation of a handoff of the communications session to the third device to enable seamless continuation of the communications session.

2. The method of claim 1, wherein transmitting the advertisement message corresponding to the communications session comprises transmitting the advertisement message, by the first device during the communications session, to at least the third device.

3. The method of claim 1, wherein the communications session control message indicates availability of the third device to assume the communications session from the first device.

4. The method of claim 2, wherein transmitting the advertisement message corresponding to the communications session comprises transmitting the advertisement message directly from the first device to the third device.

5. The method of claim 2, wherein the advertisement message includes a session-specific participant ID and a stream ID, wherein the session-specific participant ID and the stream ID are both associated with the communications session and the first device.

6. The method of claim 1, wherein the communications session control message includes at least an account identifier associated with the third device, a participant handle associated with the third device, and a data object that includes participant association information.

7. The method of claim 6, wherein the participant association information includes a session-specific participant ID and a stream ID, wherein the session-specific participant ID and the stream ID are both based on the advertisement message.

8. The method of claim 6, wherein the receiving the communications session control message comprises receiving the communications session control message from a communications session server via a wide area network.

9. The method of claim 1, wherein the validating the third device based on the communications session control message comprises:

determining that the communications session control message includes a data object; and determining that participant association information in the data object includes at least a session-specific participant ID and a stream ID of the first device.

10. The method of claim 9, wherein the validating the third device based on the communications session control message further comprises determining that the communications session control message includes an account identifier associated with the first device and a participant handle associated with the first device.

11. The method of claim 1, wherein the removing the first device from the communications session comprises transmitting, by the first device and to a communications session server, a leave message corresponding to the communications session.

12. A device comprising:

a processor configured to:

transmit an advertisement message corresponding to a communications session the device is participating in with at least a second device;

receive, during the communications session, a communications session control message generated by a third device, the communications session control message comprising information contained in the advertisement message;

validate the third device based on the communications session control message; and remove the device from the communications session in response to successfully validating the third device, wherein, to remove the device from the communications session, the processor is further configured to cause initiation of a handoff of the communications session to the third device to enable seamless continuation of the communications session.

13. The device of claim 12, wherein the processor is configured to transmit the advertisement message corresponding to the communications session by transmitting the advertisement message, during the communications session, to at least the third device.

14. The device of claim 13, wherein the advertisement message includes a session-specific participant ID and a stream ID, wherein the session-specific participant ID and the stream ID are both associated with the communications session and the device.

15. The device of claim 12, wherein the processor is configured to validate the third device based on the communications session control message by:

determining that the communications session control message includes a data object; and determining that participant association information in the data object includes at least a session-specific participant ID and a stream ID of the device.

16. The device of claim 15, wherein the processor is configured to validate the third device based on the communications session control message further by determining that the communications session control message includes an account identifier associated with the device and a participant handle associated with the device.

17. A non-transitory computer-readable medium comprising computer-readable instructions that, when executed by a processor, cause the processor to perform one or more operations comprising:

transmitting, by a first device, an advertisement message corresponding to a communications session the first device is participating in with at least a second device;

receiving, by the first device and during the communications session, a communications session control message generated by a third device, the communications session control message comprising information contained in the advertisement message;

validating, with the first device, the third device based on the communications session control message; and removing the first device from the communications session in response to successfully validating the third device, wherein removing the first device comprises causing initiation of a handoff of the communications session to the third device to enable seamless continuation of the communications session.

18. The non-transitory computer-readable medium of claim 17, wherein transmitting the advertisement message corresponding to the communications session comprises transmitting the advertisement message, by the first device during the communications session, to at least the third device.

19. The non-transitory computer-readable medium of claim 18, wherein the advertisement message includes a session-specific participant ID and a stream ID, wherein the session-specific participant ID and the stream ID are both associated with the communications session and the first device.

20. The non-transitory computer-readable medium of claim 17, wherein the validating the third device based on the communications session control message comprises:

determining that the communications session control message includes a data object; and determining that participant association information in the data object includes at least a session-specific participant ID and a stream ID of the first device.

21. The non-transitory computer-readable medium of claim 20, wherein the validating the third device based on the communications session control message further comprises determining that the communications session control message includes an account identifier associated with the first device and a participant handle associated with the first device.

* * * * *